No. 832,380. PATENTED OCT. 2, 1906.
J. HARTNESS.
TAP AND PROCESS OF MAKING THE SAME.
APPLICATION FILED FEB. 18, 1904.
2 SHEETS—SHEET 1.
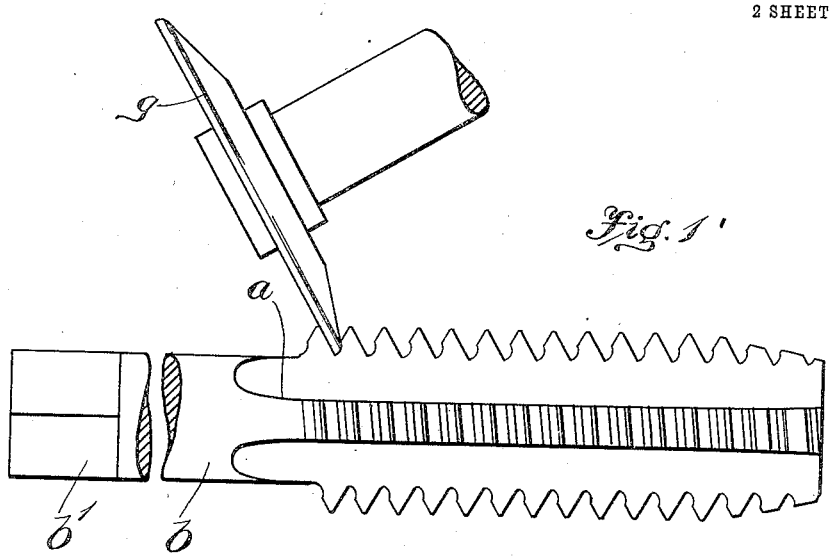
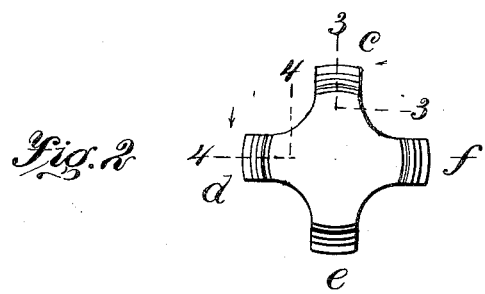
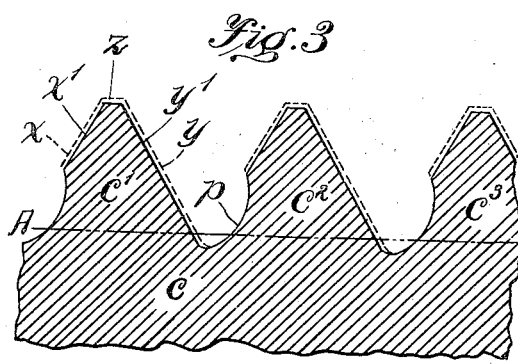
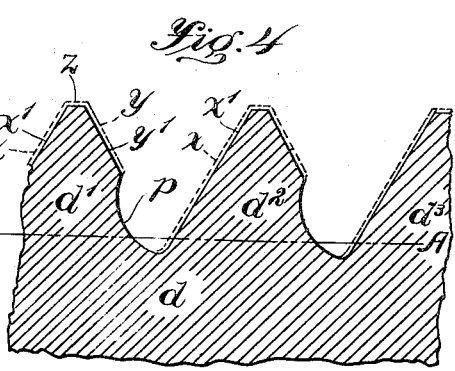
Witnesses:
Walter P. Abell.
C. C. Stecher.
Inventor:
James Hartness
by
Eldridge + Brown + Dunlap
his Attorneys:

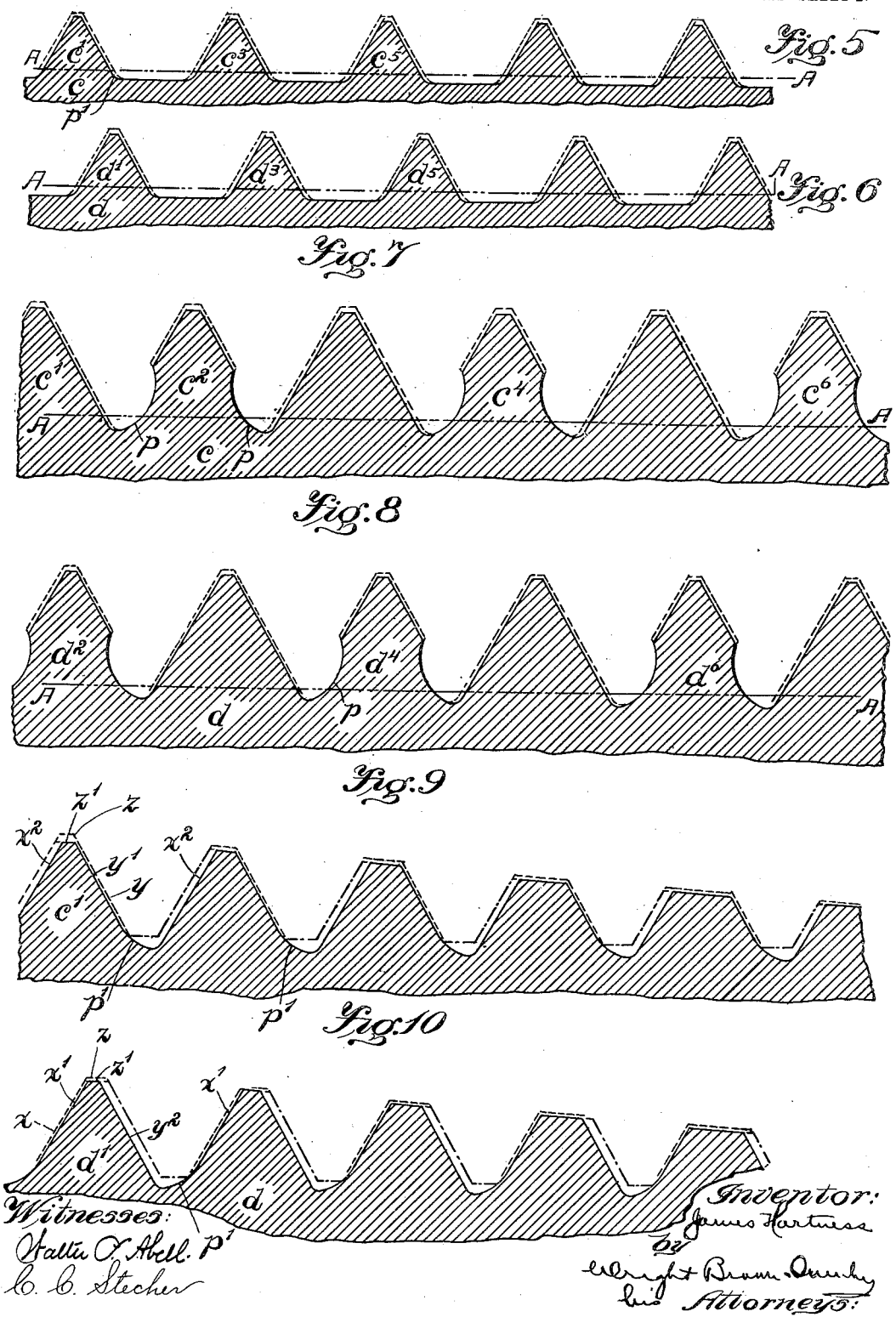

UNITED STATES PATENT OFFICE.

JAMES HARTNESS, OF SPRINGFIELD, VERMONT.

TAP AND PROCESS OF MAKING THE SAME.

No. 832,380.      Specification of Letters Patent.      Patented Oct. 2, 1906.

Application filed February 18, 1904. Serial No. 194,170.

*To all whom it may concern:*

Be it known that I, JAMES HARTNESS, of Springfield, in the county of Windsor and State of Vermont, have invented certain new and useful Improvements in Taps and Processes of Making the Same, of which the following is a specification.

This invention has relation to taps and to methods of manufacturing them.

The object of the invention is the production of a finished tap having an exact predetermined diameter and an accurate lead—*i. e.*, the exact number of accurately-spaced teeth in the given length of the tap and without the inaccuracies which have heretofore resulted from the previous methods of producing taps.

Heretofore it has been customary to first cut or otherwise form upon a tap-blank teeth of substantially the exact diameter desired and of a lead sufficiently greater or less than the lead of the desired finished article to compensate for the expansion or contraction of the particular steel used in its manufacture. After forming the tap-blank as nearly as possible like the desired finished article it has been customary to then subject the blank to the hardening process. The expansion and contraction of the steel are not sufficiently uniform, however, to make the process as described reliable, since it results in bending the tap or making it crooked, in destroying the accuracy of the lead and the diameter of the tap, and in distorting the shape of the teeth for fine work. Such taps are inefficient and untrustworthy. According to the present invention these above-noted imperfections and inaccuracies are entirely obviated and prevented by first forming the blank with teeth having an excess of material or stock on their sides and tops sufficient to compensate for lateral distortion of the teeth and for the curvature or crookedness of the tap, hardening the blanks, and then grinding off the surplus or excess material from the teeth to produce a perfect lead and the exact predetermined diameter. To aid in the grinding operation, some of the teeth are formed with clearances at their bases for the reception of the grinding-tool, these clearances being so located that they do not interfere with or effect the result desired to be produced by the tap in tapping a hole. The result of my process is a straight and true tap with an accurate lead and an exact diameter and with clearances at the bases of the teeth, or some of them, as hereinafter described.

Referring to the accompanying drawings, Figure 1 represents a tap in process of construction, grinding-tools being illustrated as in the act of removing the excess or surplus material from the sides of some of the teeth. Fig. 2 represents an end view of the tap. Fig. 3 represents an enlarged section on the line 3 3 of Fig. 2. Fig. 4 represents an enlarged section on the line 4 4 of Fig. 2. Figs. 5 and 6 represent enlarged sections through the teeth of another tap embodying the invention. Figs. 7 and 8 are similar sections through the teeth of still another form of tap embodying the invention. Figs. 9 and 10 represent sections through the teeth of a tap embodying the invention.

It will be understood that the invention may be practiced or embodied in ways and devices other than those illustrated and described and, further, that the terms and phraseology are employed for the purpose of description and not of limitation.

In carrying out the invention a blank $a$, of relatively soft metal, is produced, which is cylindrical in form. Upon this blank are formed threads by a rolling, cutting, or milling process, the blank having the usual shank $b$, squared, as at $b'$. The blank may be then longitudinally milled or grooved to divide the threads into a plurality of series of teeth, there being usually four series $c\ d\ e\ f$, respectively, although the number may be varied as desired. All of the teeth approximate in a general way the shape of the finished teeth; but they are initially formed on their sides one (or both) and tops with sufficient stock or excess material to permit of a considerable distortion or bodily displacement of the teeth in the hardening process without their entirely leaving the spaces to be occupied by the finished teeth. The surplus or excess material is graphically represented as lying between the full and dotted lines in the various figures illustrating the teeth on an enlarged scale. The blank after being thus initially formed is subjected to the usual hardening process and brought to that condition in which it is proof against the attacks of the usual cutting devices or tools, so that the teeth can only be reduced by abrasion, as by the employment of an emery-wheel. After the hardening process each tooth is ground to remove the surplus or excess material to bring the tap to the exact predetermined diameter, with the teeth accurately spaced and with all of the teeth in such condition as to perform their work in tapping a hole without inaccuracies.

In order that the teeth may be ground to the desired size and lead, some of the teeth, as stated, are formed with clearances at their bases for the grinding-tool, which is indicated at $g$ as in the form of an emery-wheel. These clearances may be variously formed and located. In Fig. 3, for instance, the series $c$ is illustrated, and in Fig. 4 the series $d$. The teeth $c'$, $c^2$, and $c^3$ are each formed with excess material $x\ y\ z$ on their sides and tops. Each of the teeth has upon its left side a clearance $p$, which extends below the base-line of the teeth, said base-line being indicated by the dotted line A A in all the figures. The clearance $p$ is sufficient in size to permit of the entrance of the edge or rim of the emery-wheel $g$ and permit the grinding of the side $y'$ of the tooth from its crown or top to the base-line. The series $d'\ d^2\ d^3$, which follow successively the teeth $c'\ c^2\ c^3$, are likewise formed with excess material; but it will be observed that in these teeth the clearance $p$ is formed in the sides $y'$ of the teeth to permit of the grinding of the side $x'$ from its crown to or below its base-line. The sides $x'$ of the teeth $c'\ c^2$ and the sides $y'$ of the teeth $d'\ d^2$, &c., are ground simply from the crown to the upper end of the clearance, and consequently there is no necessity for the formation of a clearance in this case in the sides $y'$ of the teeth $d'\ d^2$ or in the sides $x'$ of the teeth $c'\ c^2$. It will be understood that the series of teeth $e$ is formed similarly to those at $c$ and that the series $f$ is formed similarly to the series $d$.

When a tap constructed in this manner is used, the successive cutting edges on the teeth operate to remove the material in the work left by reason of the formation of the clearances. It will be understood that these clearances may be otherwise located, as previously indicated. For instance, in Figs. 5 and 6, which illustrate the series of teeth $c\ d$, respectively, each of the series $c$ is formed with alternate teeth missing—that is to say, it has the teeth $c'\ c^3\ c^5$ or $d'\ d^3\ d^5$, with the teeth $c^2\ c^4\ c^6$ and $d^2\ d^4\ d^6$ omitted. In this case the clearances $p'$ are formed below the base-line A A.

In Figs. 7 and 8, which illustrate a series of teeth $c$ and $d$, instead of omitting the alternate teeth $c^2\ c^4\ c^6$ and $d^2\ d^4\ d^6$ the clearances $p$ are formed in the sides of said alternate teeth and extend below the base-line of the remaining teeth. In both forms of the tap shown in Figs. 5 and 6 and 7 and 8 each series of teeth is formed to remove from the work the material left by the preceding series of teeth.

In Figs. 9 and 10 a construction is illustrated in which in each series of teeth only one side and the crown of the tooth are adapted to operate upon the work. In these two figures the full lines indicate the finished teeth, the dotted lines indicating the excess material left upon the tooth prior to the grinding operation and the dot-and-dash lines indicating the extent of the cut formed in the work by the successive series of teeth.

It will be observed that in Fig. 9, for instance, the tooth $c'$ has a cutting edge $y'$ and the crown $z'$, the excess material $y$ and $z$ being ground away in accordance with the previously-described process. The other side $x^2$ of the tooth is initially formed so as to leave a clearance between it and the work in order that the clearance $p$ may be formed at the bases of the sides $y'$. The cutting edges of each tooth are, as stated, on the sides $y'$ and the crown $z'$. In the succeeding series of teeth $d$ the tooth $d'$ has its side $y^2$ cut away for the formation of the clearance $p$ at the base of the cutting edge or side $x'$ on the next tooth of the same series. In the operation of the tap constructed in this manner the material left in the work by the side $x^2$ of the tooth $c'$ is removed by the cutting edge $x'$ of the next succeeding tooth of the second series. The teeth in Figs. 9 and 10 are illustrated as being at the front end of the tap, with their crowns beveled in the usual manner. The teeth in all of these figures are similar in that there are clearances formed at the base of some of the teeth and with the teeth so formed that the material left by the clearances is removed by the successive series of teeth. The teeth are further similar in that they are ground to an exact size, diameter, and lead, so as to cut or form threads in the work with unvarying accuracy.

Having thus explained the nature of the invention and described a way of constructing and using the same, although without attempting to set forth all of the forms in which it may be made or all of the modes of its use, I declare that what I claim is—

1. The herein-described process of producing taps, which consists in forming a tap-blank with excess material on the teeth, and with clearances within the base-line of the teeth to receive an abrading-tool, hardening the blank, and removing by abrasion the excess material on said teeth, to reduce them to a predetermined size and lead.

2. The herein-described process of producing taps which consists in forming a tap-blank with excess material on the crowns and sides of the teeth, and with clearances within the base-line of the teeth to receive an abrading-tool hardening said blank, and by abrasion removing the excess material from the crowns and sides of said teeth to reduce them to a predetermined diameter, size and lead.

3. A tap-blank of relatively soft metal having an excess of material on its teeth sufficient to compensate for distortion in a subsequent hardening of the blank, and clearances within the base-lines of some of the teeth to receive an abrading-tool.

In testimony whereof I have affixed my signature in presence of two witnesses.

JAMES HARTNESS.

Witnesses:
   D. S. BROWNELL,
   A. N. HOWE.